(12) United States Patent
Jeong et al.

(10) Patent No.: US 9,547,211 B2
(45) Date of Patent: Jan. 17, 2017

(54) LIQUID CRYSTAL DISPLAY

(71) Applicant: Samsung Display Co., Ltd., Yongin (KR)

(72) Inventors: Youn Hak Jeong, Cheonan-si (KR); Hong Min Yoon, Seoul (KR); Ho Jun Lee, Cheonan-si (KR); Seung-Kyu Lee, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 241 days.

(21) Appl. No.: 14/258,910

(22) Filed: Apr. 22, 2014

(65) Prior Publication Data

US 2015/0168757 A1    Jun. 18, 2015

(30) Foreign Application Priority Data

Dec. 13, 2013  (KR) ........................ 10-2013-0155781

(51) Int. Cl.
*G02F 1/1368* (2006.01)
*G02F 1/1362* (2006.01)
*G09G 3/36* (2006.01)

(52) U.S. Cl.
CPC ....... *G02F 1/1368* (2013.01); *G02F 1/136286* (2013.01); *G09G 3/3648* (2013.01); *G09G 2300/0426* (2013.01); *G09G 2300/0447* (2013.01); *G09G 2320/0242* (2013.01)

(58) Field of Classification Search
CPC ............. G02F 1/1368; G02F 1/136286; G09G 3/3648; G09G 2300/0447; G09G 2320/0242; G09G 3/3659; G09G 2300/0452; G09G 2300/0439; G09G 2300/0426; G09G 2320/0666
See application file for complete search history.

(56) References Cited

U.S. PATENT DOCUMENTS

| 7,474,292 | B2 | 1/2009 | Kamada et al. |
| 7,683,991 | B2 | 3/2010 | Lee et al. |
| 8,208,080 | B2 | 6/2012 | Zhu et al. |
| 8,279,385 | B2 | 10/2012 | Kim et al. |
| 8,379,176 | B2 | 2/2013 | Kim et al. |

(Continued)

FOREIGN PATENT DOCUMENTS

KR    10-1071252    10/2011

*Primary Examiner* — Julie Anne Watko
(74) *Attorney, Agent, or Firm* — H.C. Park & Associates, PLC

(57) ABSTRACT

A liquid crystal display is provided. The display includes: gate lines applied with a gate signal; data lines applied with a data signal; reference voltage lines respectively applied with first and second reference voltage having different polarities; first, second, and third subpixel electrodes included in one pixel area; a first switching element connected to the first gate line, the first data line, and the first subpixel electrode; a second switching element connected to the first gate line, the first data line, and the second subpixel electrode; a third switching element connected to the first or second gate line, the first or second data line, and the third subpixel electrode; a fourth switching element connected to the first gate line, the first reference voltage line, and the first subpixel electrode; and a fifth switching element connected to the first gate line, the second reference voltage line, and the second subpixel electrode.

8 Claims, 10 Drawing Sheets

(56) References Cited

U.S. PATENT DOCUMENTS

| | | | |
|---|---|---|---|
| 8,421,986 B2 | 4/2013 | Chen et al. | |
| 9,348,188 B2 * | 5/2016 | Shin | G02F 1/136286 |
| 2008/0284929 A1 * | 11/2008 | Kimura | G02F 1/13624 |
| | | | 349/38 |
| 2008/0284931 A1 * | 11/2008 | Kimura | G02F 1/13624 |
| | | | 349/39 |
| 2008/0297676 A1 * | 12/2008 | Kimura | G02F 1/13624 |
| | | | 349/39 |
| 2009/0015741 A1 | 1/2009 | Kim | |
| 2009/0310047 A1 * | 12/2009 | Shin | G09G 3/3659 |
| | | | 349/37 |
| 2010/0157185 A1 * | 6/2010 | Kim | G02F 1/1362 |
| | | | 349/38 |
| 2011/0222004 A1 | 9/2011 | Kim | |
| 2012/0300148 A1 | 11/2012 | Hong et al. | |
| 2013/0057818 A1 * | 3/2013 | Cho | G02F 1/134363 |
| | | | 349/141 |
| 2014/0313444 A1 * | 10/2014 | Kimura | G02F 1/13624 |
| | | | 349/42 |

\* cited by examiner

LIQUID CRYSTAL DISPLAY

CROSS REFERENCE TO RELATED APPLICATION

This application claims priority from and the benefit of Korean Patent Application No. 10-2013-0155781, filed on Dec. 13, 2013, which is hereby incorporated by reference for all purposes as if fully set forth herein.

BACKGROUND

Field

Exemplary embodiments of the present invention relate to a liquid crystal display.

Discussion of the Background

A liquid crystal display (LCD) is one of the most common types of flat panel displays currently in use, and typically includes two display panels, each having a field generating electrode, such as a pixel electrode and a common electrode, and a liquid crystal layer interposed therebetween. The liquid crystal display generates an electric field in a liquid crystal layer by applying voltages to the field generating electrodes. The electric field determines the direction of liquid crystal (LC) molecules in the liquid crystal layer, and controls polarization of incident light through the generated electric field to display images.

Among the LCDs, a vertical alignment (VA) mode LCD, which aligns LC molecules such that their long axes are perpendicular to the panels in the absence of an electric field, is spotlighted because of its high contrast ratio and wide reference viewing angle. Herein, the reference viewing angle generally implies a viewing angle that has a contrast ratio of 1:10, or a critical angle of gray-to-gray luminance reversion.

In the vertically aligned mode liquid crystal display, in order for side visibility to be close in quality to front visibility, a method has been proposed in which one pixel is divided into two subpixels and a voltage of either subpixel is increased or decreased. As a result, voltages of the two subpixels are different from each other so that transmittances thereof are different from each other.

However, as described above, in the case where one pixel is divided into two subpixels and the voltage of either subpixel is increased or decreased and, as a result voltages of the two subpixels are different from each other, a loss of luminance is generated in a high gray or color distortion is generated in a middle gray by a bump phenomenon.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a liquid crystal display having a 3-division high visibility structure.

An exemplary embodiment of the present invention provides a liquid crystal display including a first gate line and a second gate line to which a gate signal is applied; a first data line and a second data line to which a data signal is applied; a first reference voltage line and a second reference voltage line to which a first reference voltage and a second reference voltage having different polarities are respectively applied; a first subpixel electrode, a second subpixel electrode, and a third subpixel electrode included in one pixel area; a first switching element connected to the first gate line, the first data line, and the first subpixel electrode; a second switching element connected to the first gate line, the first data line, and the second subpixel electrode; a third switching element connected to one of the first gate line and the second gate line, one of the first data line and the second data line, and the third subpixel electrode; a fourth switching element connected to the first gate line, the first reference voltage line, and the first subpixel electrode; and a fifth switching element connected to the first gate line, the second reference voltage line, and the second subpixel electrode.

An exemplary embodiment of the present invention also discloses a liquid crystal display including a first gate line and a second gate line to which a gate signal is applied; a first data line and a second data line to which a data signal is applied; a reference voltage line to which a first reference voltage is applied; a shielding electrode line extending in the same direction as that of the first data line or the second data line; a first subpixel electrode, a second subpixel electrode, and a third subpixel electrode included in one pixel area; a first switching element connected to the first gate line, the first data line, and the first subpixel electrode; a second switching element connected to the first gate line, the first data line, and the second subpixel electrode; a third switching element connected to one of the first gate line and the second gate line, one of the first data line and the second data line, and the third subpixel electrode; a fourth switching element connected to the first gate line, the first reference voltage line, and the first subpixel electrode; and a fifth switching element connected to the first gate line, the shielding electrode line, and the second subpixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
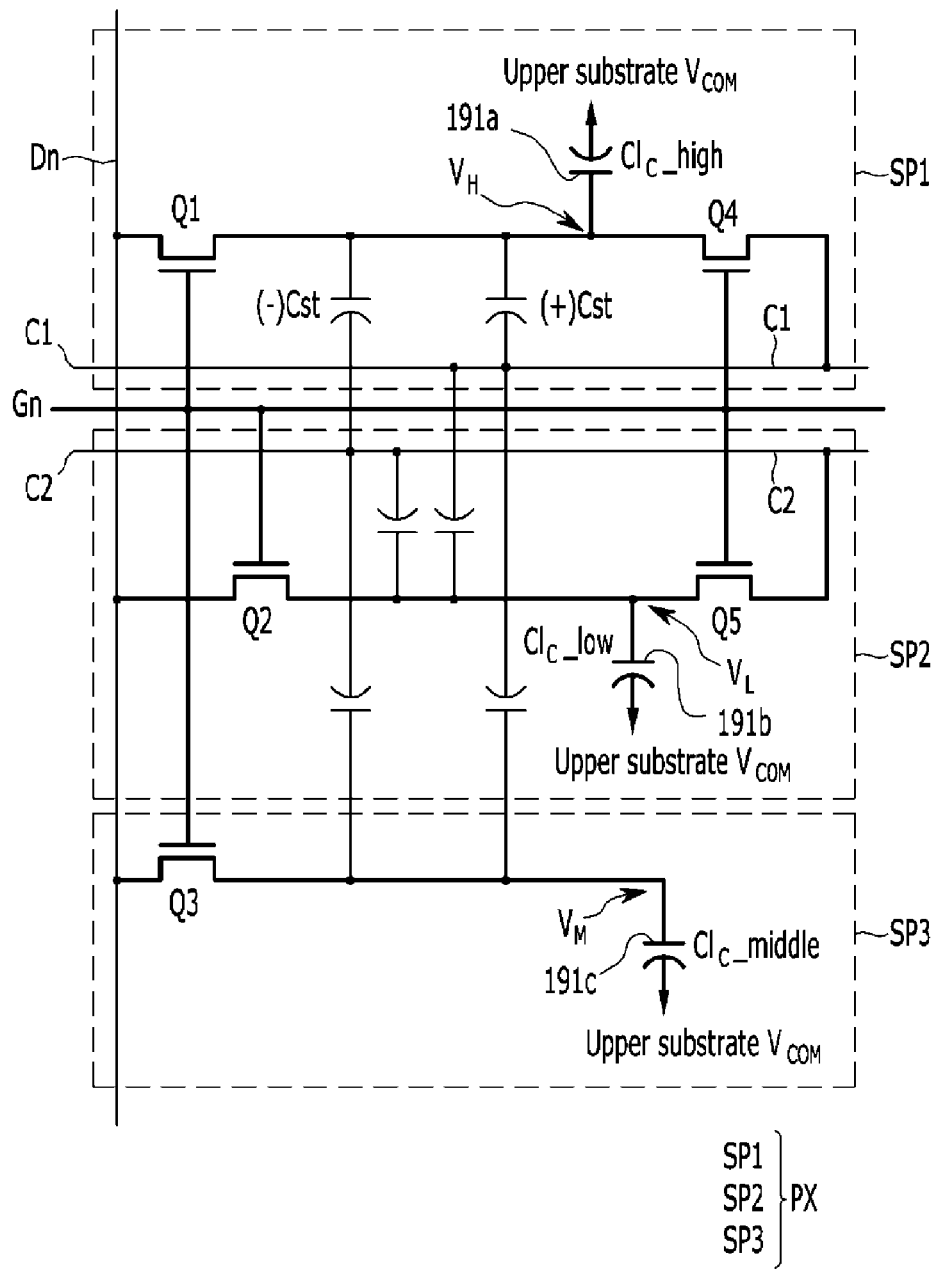
FIG. 1 is an equivalent circuit diagram showing a liquid crystal display in accordance with an exemplary embodiment of the present invention.

Hereinafter, an exemplary embodiment of the present invention will be described in detail with reference to the attached drawings such that the present invention can be easily put into practice by those skilled in the art. As those skilled in the art would realize, the described embodiments may be modified in various different ways, all without departing from the spirit or scope of the present invention. On the contrary, exemplary embodiments introduced herein are provided to make disclosed contents thorough and complete, and sufficiently transfer the spirit of the present invention to those skilled in the art.

In the drawings, the thickness of layers and regions may be exaggerated for clarity. In addition, when a layer is described to be formed on another layer or on a substrate, this means that the layer may be formed on the other layer or on the substrate, or a third layer may be interposed between the layer and the other layer or the substrate. Like numbers refer to like elements throughout the specification.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

A pixel arrangement and a signal line of a liquid crystal display, and a driving method thereof in accordance with an exemplary embodiment of the present invention will be described with reference to FIG. 1. FIG. 1 is an equivalent circuit diagram showing the liquid crystal display in accordance with the exemplary embodiment of the present invention. FIG. 1 shows one pixel area. Each pixel PX indicating one pixel area includes subpixel areas SP1, SP2, and SP3. The pixels PX may be repeatedly arranged in vertical and horizontal directions.

Referring to FIG. 1, in the liquid crystal display of the present exemplary embodiment, signal lines include a plurality of gate lines Gn for transmitting gate signals (alternatively referred to as "scanning signals"), a plurality of data lines Dn for transmitting data voltages, and a plurality of pairs of reference voltage lines C1 and C2 for transmitting predetermined reference voltages. Herein, n is a natural number. The reference voltage lines C1 and C2 include a first reference voltage line C1 and a second reference voltage line C2 for transferring reference voltages of different polarities. A first reference voltage and a second reference voltage of constant magnitude are respectively applied to the first reference voltage line C1 and the second reference voltage line C2, and the polarities of the first reference voltage and the second reference voltage are changed per frame. For example, when the magnitude of the common voltage is about 7.5 V, the first reference voltage may have a magnitude of about 15 V in a frame, while the second reference voltage may inversely have a magnitude of about 0 V in the same frame. In another example, when the magnitude of the common voltage is about 7.5 V, the first reference voltage may have a magnitude of about 0 V in a frame, while the second reference voltage may inversely have a magnitude of about 15 V in the same frame. The first reference voltage or the second reference voltage may be greater or smaller than a maximum level applied to the data voltage. Further, a difference between a common voltage and the first reference voltage and the second reference voltage, respectively, when the first reference voltage and the second reference voltage have positive polarity with respect to the common voltage may be different from a difference between the common voltage and the first reference voltage and the second reference voltage, respectively, when the first reference voltage and the second reference voltage have negative polarity with respect to the common voltage.

In the present exemplary embodiment, the pixel PX includes the first gate line Gn, the first data line Dn, the first reference voltage line C1, the second reference voltage line C2, a first switching element Q1, a second switching element Q2, a third switching element Q3, a fourth switching element Q4, a fifth switching element Q5, a first liquid crystal capacitor Clc_high and a second liquid crystal capacitor Clc_low, a third liquid crystal capacitor Clc_middle, and a plurality of storage capacitors (not shown).

The first switching element Q1, the second switching element Q2, the third switching element Q3, the fourth switching element Q4, and the fifth switching element Q5 are connected to the first gate line Gn and the first data line Dn. In the present exemplary embodiment, the fourth switching element Q4 is connected to the first gate line Gn, the first reference voltage line C1, and an output terminal of the first switching element Q1, and the fifth switching element Q5 is connected to the first gate line Gn, the second reference voltage line C2, and an output terminal of the second switching element Q2.

Control terminals of the first switching element Q1, the second switching element Q2, and the third switching element Q3 as three-terminal elements, such as thin film transistors, are connected to the first gate line Gn, and input terminals thereof are connected to the first data line Dn. Further, an output terminal of the first switching element Q1 is connected to a first subpixel electrode 191a or the first liquid crystal capacitor Clc_high and an output of fourth switching element Q4. An output of the second switching element Q2 is connected to a second subpixel electrode 191b or the second liquid crystal capacitor Clc_low and an output of the fifth switching element Q5. An output of the third switching element Q3 is connected to a third subpixel electrode 191c or the third liquid crystal capacitor Clc_middle.

Control terminals of the fourth switching element Q4 and the fifth switching element Q5 as the three terminal elements, such as thin film transistors, are also connected to the first gate line Gn. An input terminal of the fourth switching element Q4 is connected to the first reference voltage line C1, and an output terminal thereof is connected to the first subpixel electrode 191a or the first liquid crystal capacitor Clc_high. An input terminal of the fifth switching element Q5 is connected to the second reference voltage line C2, and an output terminal thereof is connected to the second subpixel electrode 191b or the second liquid crystal capacitor Clc_low.

When a gate-on signal is applied to the first gate line Gn, the first switching element Q1, the second switching element Q2, the third switching element Q3, the fourth switching element Q4, and the fifth switching element Q5, which are connected thereto, are turned on. Accordingly, a data voltage applied to the first data line Dn is applied to the subpixel electrodes 191a, 191b, and 191c as one terminal of the first liquid crystal capacitor Clc_high, the second liquid crystal capacitor Clc_low and the third liquid crystal capacitor Clc_middle through the first switching element Q1, the second switching element Q2, and the third switching element Q3, respectively. Accordingly, the first liquid crystal capacitor Clc_high, the second liquid crystal capacitor Clc_low, and the third liquid crystal capacitor Clc_middle are charged with the same voltage.

Simultaneously, one terminal of the first liquid crystal capacitor Clc_high is connected to the output terminal of the fourth switching element Q4 to be stepped up by a first reference voltage which is applied to the first reference voltage line C1 through the fourth switching element Q4. In this case, the first reference voltage applied to the first reference voltage line C1 has the same polarity as the data voltage applied to the first data line Dn, and a magnitude thereof may be larger than that of the data voltage applied to the first data line Dn. Accordingly, the voltage of the first reference voltage line C1 to which a relatively high voltage is applied through the fourth switching element Q4 is divided. Thus, the voltage that is charged to the first liquid crystal capacitor Clc_high has a higher value than the data voltage applied through the first data line Dn.

One terminal of the second liquid crystal capacitor Clc_low is connected to the output terminal of the fifth switching element Q5 to be boosted by a second reference voltage, which is applied to the second reference voltage line C2 through the fifth switching element Q5.

In this case, the second reference voltage applied to the second reference voltage line C2 has the opposite polarity to the data voltage applied to the first data line Dn, and a magnitude thereof may be smaller than that of the data voltage applied to the first data line Dn. Accordingly, the voltage of the second reference voltage line C2 to which a relatively low voltage is applied through the fifth switching element Q5 is divided, and thus, the voltage charged to the second liquid crystal capacitor Clc_high has a lower value than the data voltage applied through the first data line Dn.

As for the third liquid crystal capacitor Clc_middle, the data voltage applied to the first data line Dn is inputted into the third liquid crystal capacitor Clc_middle without modification, and thus, the voltage charged in the third liquid crystal capacitor Clc_middle is larger than the voltage charged in the second liquid crystal capacitor Clc_low and is smaller than the voltage charged in the first liquid crystal capacitor Clc_high.

As described above, the voltages charged in the first liquid crystal capacitor Clc_high, the second liquid crystal capacitor Clc_low, and the third liquid crystal capacitor Clc_middle are different from each other. Since the voltages charged in the first liquid crystal capacitor Clc_high, the second liquid crystal capacitor Clc_low, and the third liquid crystal capacitor Clc_middle are different from each other, inclined angles of liquid crystal molecules are different from each other in the first subpixel area SP1, the second subpixel area SP2, and the third subpixel area SP3, respectively. Thus, luminances of the three subpixel areas are different from each other. Accordingly, by properly controlling the voltage charged in the first liquid crystal capacitor Clc_high, the second liquid crystal capacitor Clc_low, and the third liquid crystal capacitor Clc_middle, it is possible to form an image viewed from the side to approximate an image viewed from the front, thereby improving side visibility.

Figure 2:
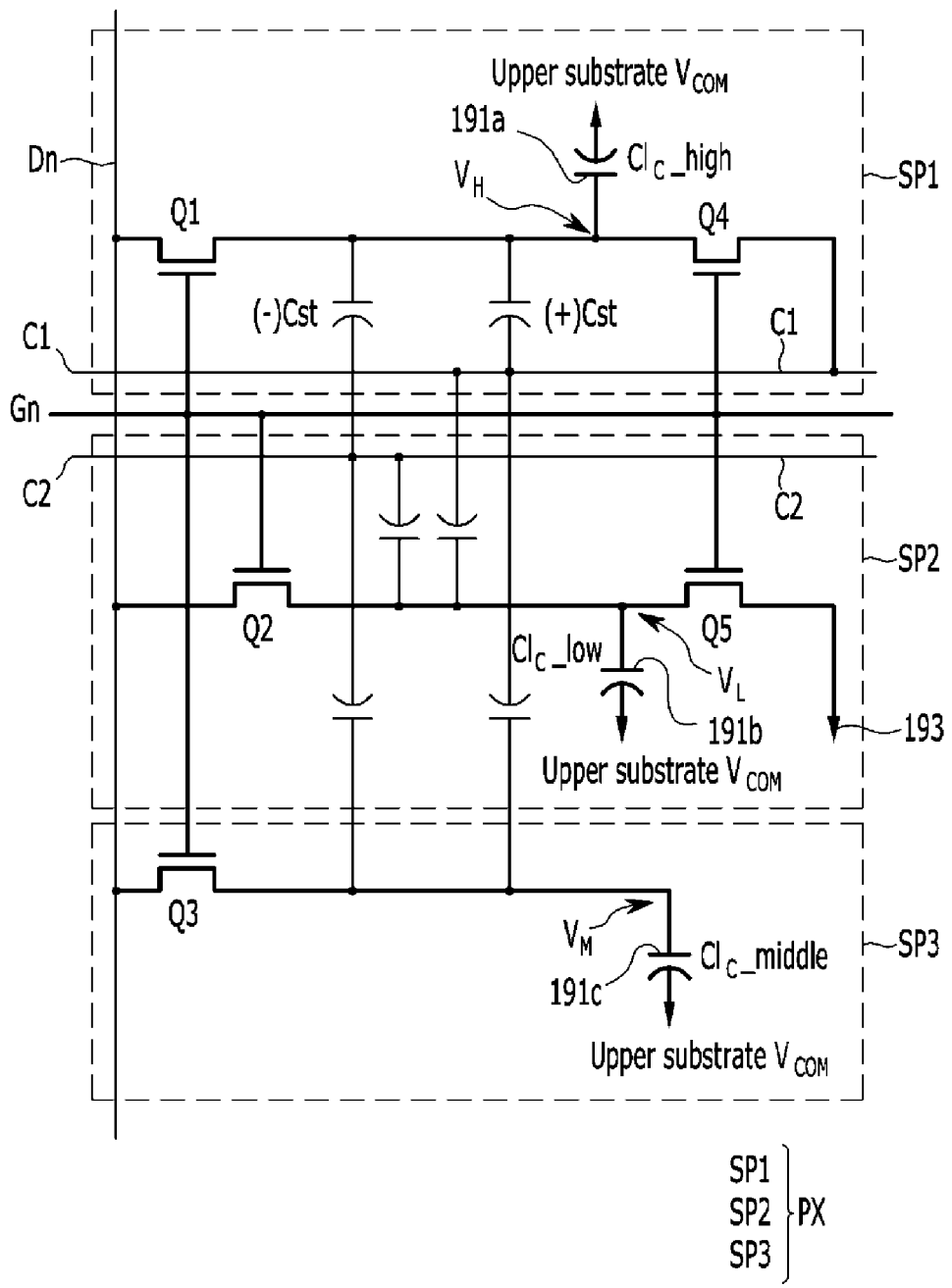
FIG. 2 is an equivalent circuit diagram showing a liquid crystal display in accordance with a first modification of the exemplary embodiment in FIG. 1.

FIG. 2 is an equivalent circuit diagram showing a liquid crystal display in accordance with a first modification of the exemplary embodiment described with reference to FIG. 1.

In the first modification, the pixel PX includes the first gate line Gn, the first data line Dn, the first reference voltage line C1, the second reference voltage line C2, the first switching element Q1, the second switching element Q2, the third switching element Q3, the fourth switching element Q4, the fifth switching element Q5, the first liquid crystal capacitor Clc_high, the second liquid crystal capacitor Clc_low, the third liquid crystal capacitor Clc_middle, and the plurality of storage capacitors (not shown).

The first switching element Q1, the second switching element Q2, the third switching element Q3, the fourth switching element Q4, and the fifth switching element Q5 are connected to the first gate line Gn and the first data line Dn. In the first modification, the fourth switching element Q4 is connected to the first gate line Gn, the first reference voltage line C1, and the output terminal of the first switching element Q1. The fifth switching element Q5 is connected to the first gate line Gn, a shielding electrode line 193, and an output terminal of the second switching element Q2.

Unlike in the exemplary embodiment described with reference to FIG. 1, in the first modification of FIG. 2, the fifth switching element Q5 is connected to the shielding electrode line 193 instead of being connected to the second reference voltage line C2. Hereinafter, the shielding electrode line 193 will be described with reference to FIG. 3.

Figure 3:
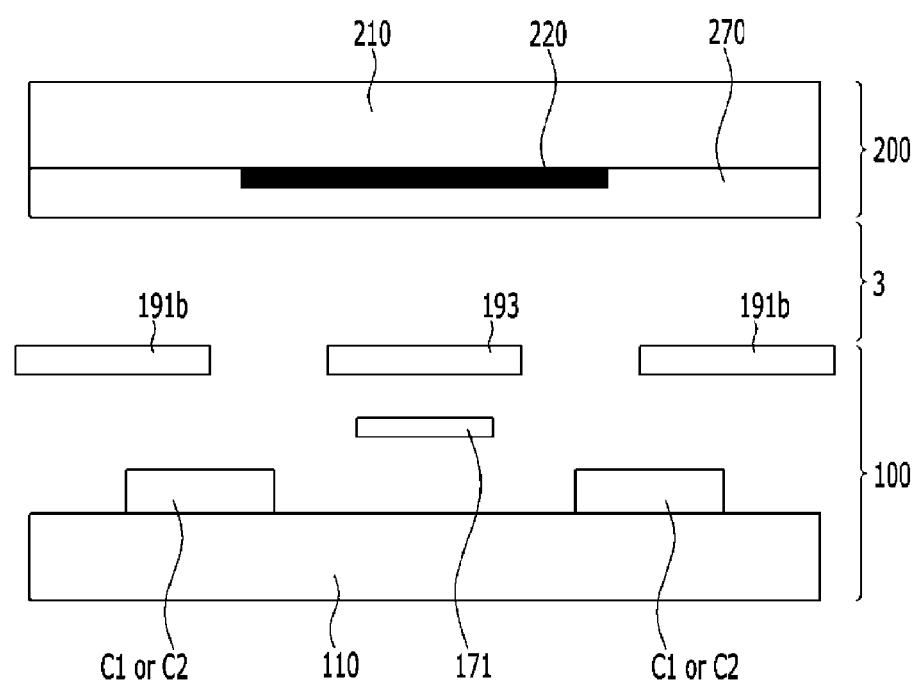
FIG. 3 is a schematic cross-sectional view showing a shielding electrode line in accordance with the first modification of FIG. 2.

FIG. 3 is a schematic cross-sectional view for showing a shielding electrode line in accordance with the first modification, shown in FIG. 2.

Referring to FIG. 3, the shielding electrode line 193 in accordance with the first modification may overlap with a data line 171. In a lower panel 100, the first reference voltage line C1 or the second reference voltage line C2 may be provided at the same layer as that of a gate line on a lower substrate 110. Although not shown, an interlayer insulating layer may be provided between the first reference voltage line C1 and/or the second reference voltage line C2 and the data line 171, and between the data line 171 and the subpixel electrode 191b and/or the shielding electrode line 193. The shielding electrode line 193 may be located at the same layer as that of the subpixel electrode 191b as a part of the pixel electrode. In an upper panel 200, a light blocking member 220 may be provided at a portion on an upper substrate 210, which overlaps with the data line 171. In this case, a width of the light blocking member 220 is wider than that of the data line 171. A common electrode 270 is provided on the upper substrate 210. The common electrode 270 forms a liquid crystal capacitor together with the subpixel electrode 191b located on the lower panel 100. A liquid crystal layer 3 may be provided between the upper panel 200 and the lower panel 100, and liquid crystal molecules are inclined by an electric field generated in the liquid crystal layer 3.

Referring to FIG. 2 again, the same voltage as the common voltage applied to the common electrode 270 may be applied to the shielding electrode line 193. One terminal of the second liquid crystal capacitor Clc_low is connected to the output terminal of the fifth switching element Q5 to be stepped down by the common voltage applied to the shielding electrode line 193 through the fifth switching element Q5.

In addition to the differences described above, the description of the exemplary embodiment of FIG. 1 may be applied to the first modification.

Figure 4:
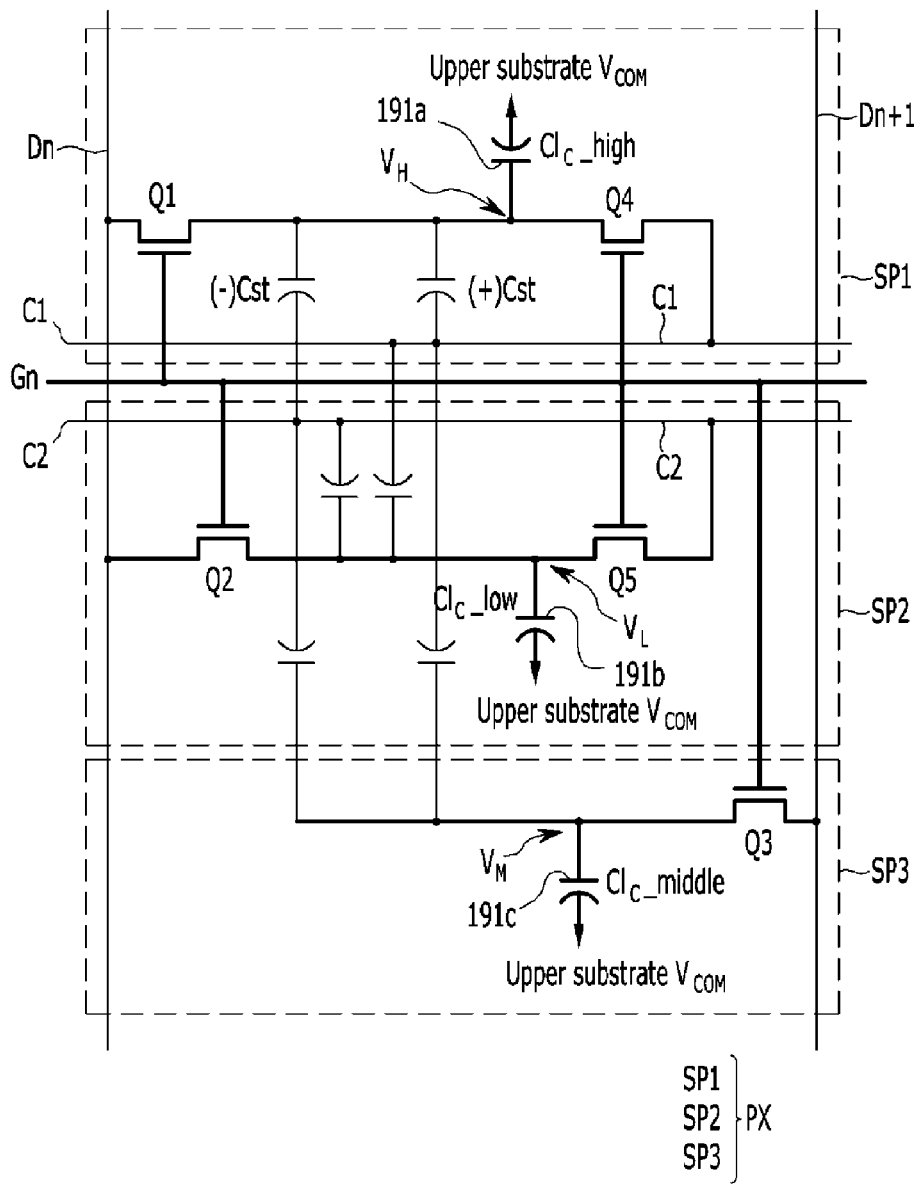
FIG. 4 is an equivalent circuit diagram showing a liquid crystal display in accordance with a second modification of the exemplary embodiment described with reference to FIG. 1.

FIG. 4 is an equivalent circuit diagram showing a liquid crystal display in accordance with a second modification of the exemplary embodiment described with reference to FIG. 1.

Referring to FIG. 4, the first switching element Q1, the second switching element Q2, the third switching element Q3, the fourth switching element Q4, and the fifth switching element Q5 are connected to the first gate line Gn and the first data line Dn. In the second modification, the third switching element Q3 is connected to a second data line $D_{n+1}$, which is disposed adjacent to the first data line Gn. In the second modification, the fourth switching element Q4 is connected to the first gate line Gn, the first reference voltage line C1, and an output terminal of the first switching element Q1. The fifth switching element Q5 is connected to the first gate line Gn, the second reference voltage line C2, and an output terminal of the second switching element Q2.

As described above, this second modification is substantially the same as the exemplary embodiment of FIG. 1 except for the difference that the third switching element Q3 is connected to the second data line $D_{n+1}$. Accordingly, in addition to the difference described above, the description of the exemplary embodiment of FIG. 1 may be applied to the second modification.

Figure 5:
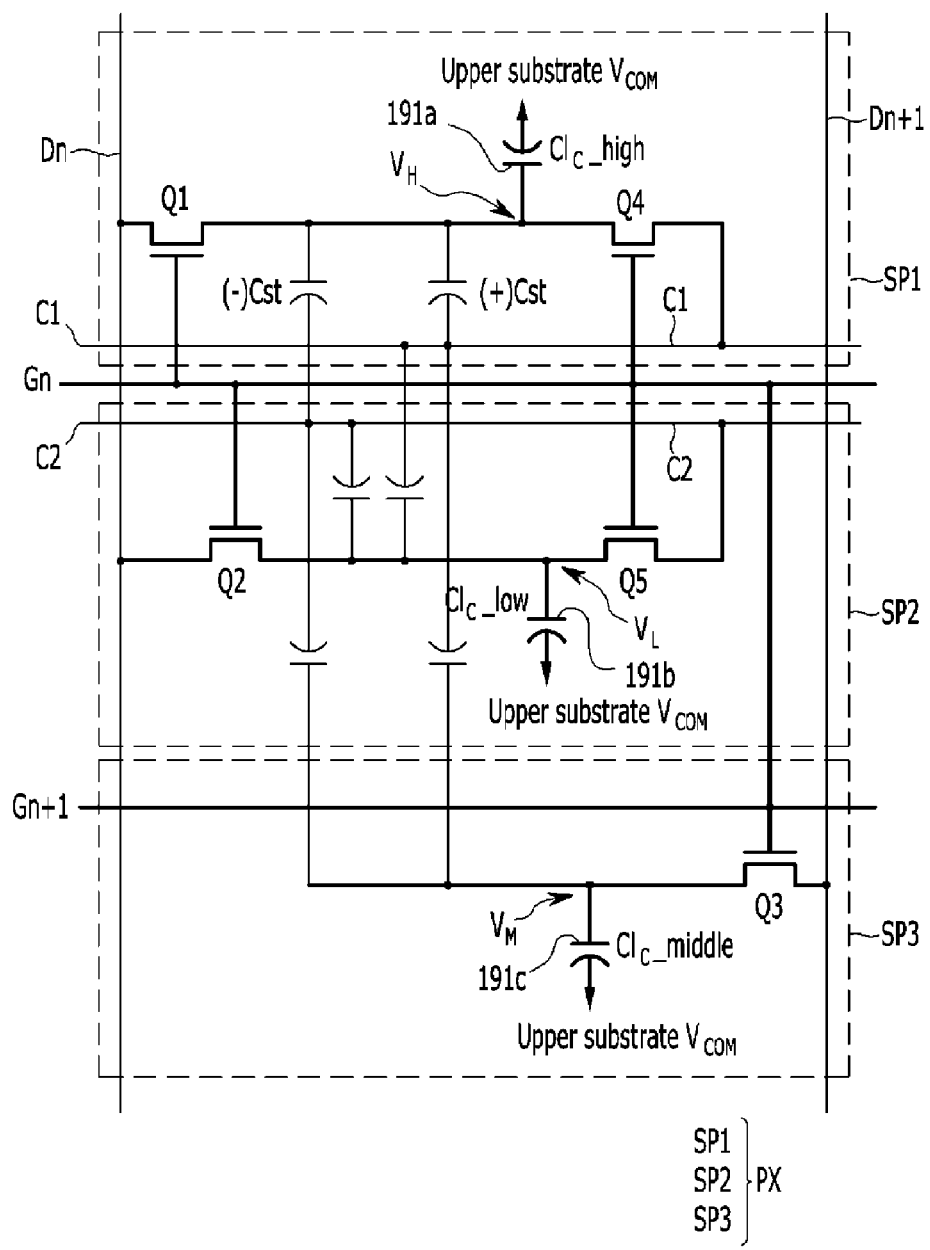
FIG. 5 is an equivalent circuit diagram showing a liquid crystal display in accordance with a third modification of the exemplary embodiment described with reference to FIG. 1.

FIG. 5 is an equivalent circuit diagram showing a liquid crystal display in accordance with a third modification of the exemplary embodiment described with reference to FIG. 1.

Referring to FIG. 5, the first switching element Q1, the second switching element Q2, the third switching element Q3, the fourth switching element Q4, and the fifth switching element Q5 are connected to the first gate line Gn and the first data line Dn. In the third modification, the third switching element Q3 is connected to a second gate line $G_{n+1}$ adjacent to the first gate line Gn, and is connected to a second data line $D_{n+1}$ adjacent to the first data line Dn. In the third modification, the fourth switching element Q4 is connected to the first gate line Gn, the first reference voltage line C1, and an output terminal of the first switching element Q1, and the fifth switching element Q5 is connected to the first gate line Gn, the second reference voltage line C2, and an output terminal of the second switching element Q2.

As described above, this third modification is substantially the same as the exemplary embodiment of FIG. 1 except for the difference that the third switching element Q3 is connected to the second gate line $G_{n+1}$ and the second data line $D_{n+1}$. Accordingly, in addition to the difference described above, the description of the exemplary embodiment of FIG. 1 may be applied to the third modification.

Figure 6:
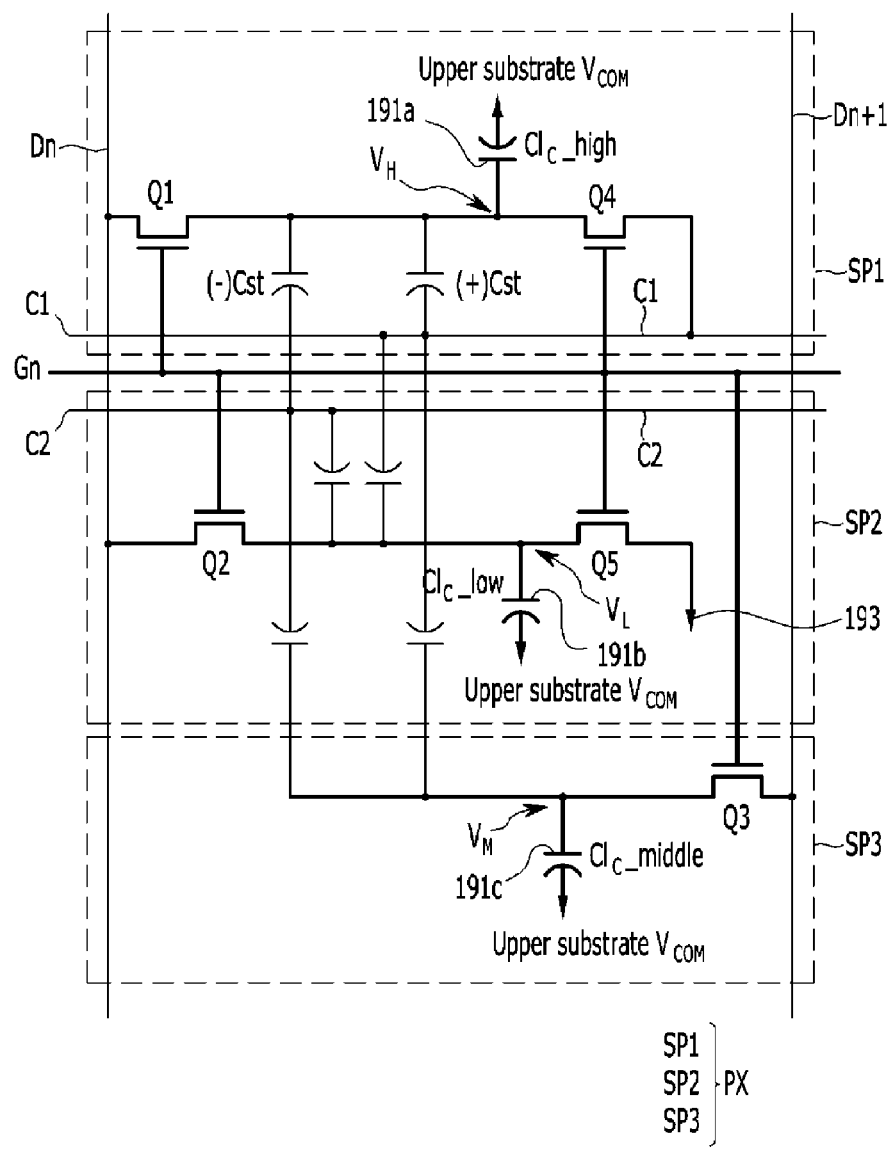
FIG. 6 is an equivalent circuit diagram showing a liquid crystal display in accordance with a fourth modification of the exemplary embodiment described with reference to FIG. 1.

FIG. 6 is an equivalent circuit diagram showing a liquid crystal display in accordance with a fourth modification of the exemplary embodiment described with reference to FIG. 1.

Referring to FIG. 6, the first switching element Q1, the second switching element Q2, the third switching element Q3, the fourth switching element Q4, and the fifth switching element Q5 are connected to the first gate line Gn and the first data line Dn. In the fourth modification, the third switching element Q3 is connected to a second data line $D_{n+1}$, which is disposed adjacent to the first data line Dn. In the fourth modification, the fourth switching element Q4 is connected to the first gate line Gn, the first reference voltage line C1, and an output terminal of the first switching element Q1. The fifth switching element Q5 is connected to the first gate line Gn, a shielding electrode line 193, and an output terminal of the second switching element Q2.

As described above, this fourth modification is substantially the same as the first modification of FIG. 2 except for the difference that the third switching element Q3 is connected to the second data line $D_{n+1}$. Accordingly, in addition to the difference described above, the description of the first modification of FIG. 2 may be applied to the fourth modification.

Figure 7:
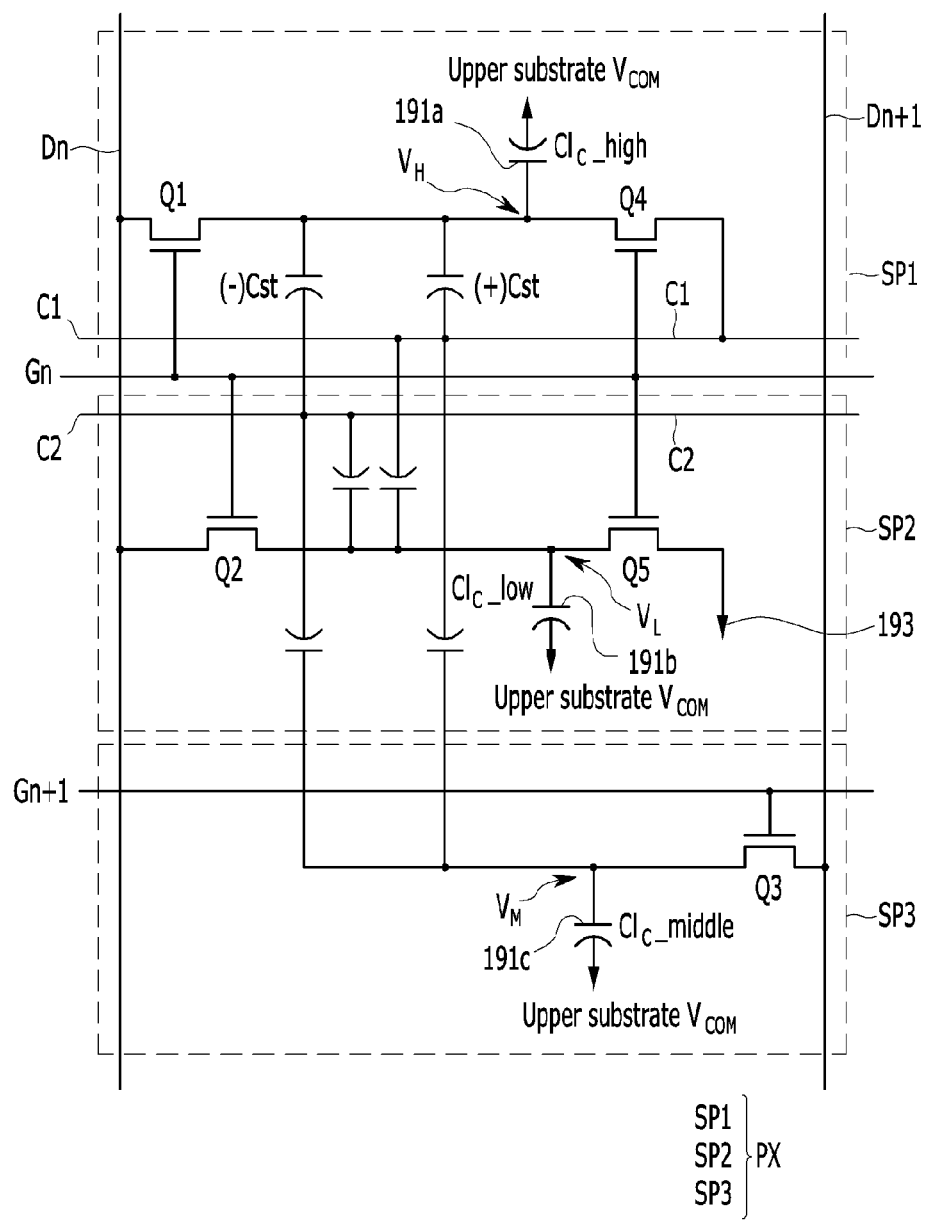
FIG. 7 is an equivalent circuit diagram showing a liquid crystal display in accordance with a fifth modification of the exemplary embodiment described with reference to FIG. 1.

FIG. 7 is an equivalent circuit diagram showing a liquid crystal display in accordance with a fifth modification of the exemplary embodiment described with reference to FIG. 1.

Referring to FIG. 7, the first switching element Q1, the second switching element Q2, the fourth switching element Q4, and the fifth switching element Q5 are connected to the first gate line Gn and the first data line Dn. In the fifth modification, the third switching element Q3 is connected to a second gate line $G_{n+1}$, disposed adjacent to the first gate line Gn, and is connected to a second data line $D_{n+1}$, disposed adjacent to the first data line Dn. In the fifth modification, the fourth switching element Q4 is connected to the first gate line Gn, the first reference voltage line C1, and an output terminal of the first switching element Q1. The fifth switching element Q5 is connected to the first gate line Gn, a shielding electrode line 193, and an output terminal of the second switching element Q2.

As described above, this fifth modification is substantially the same as the first modification of FIG. 2 except for the difference that the third switching element Q3 is connected to the second gate line $G_{n+1}$ and the second data line $D_{n+1}$. Accordingly, in addition to the difference described above, the description of the first modification of FIG. 2 may be applied to the fifth modification.

Figure 8:
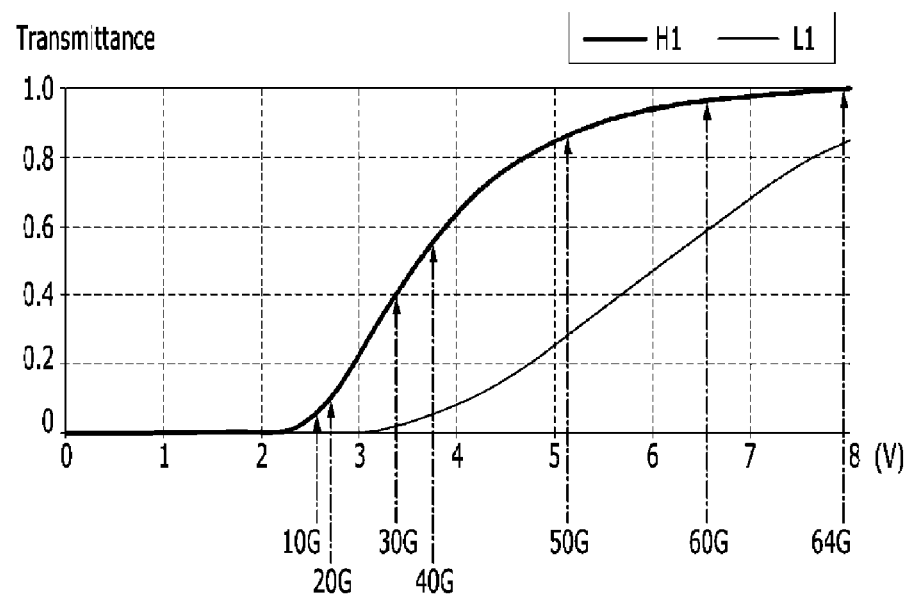
FIG. 8 and FIG. 9 are graphs showing a change in transmittance depending on a pixel voltage of the liquid crystal display in test examples of the present invention.
Figure 9:
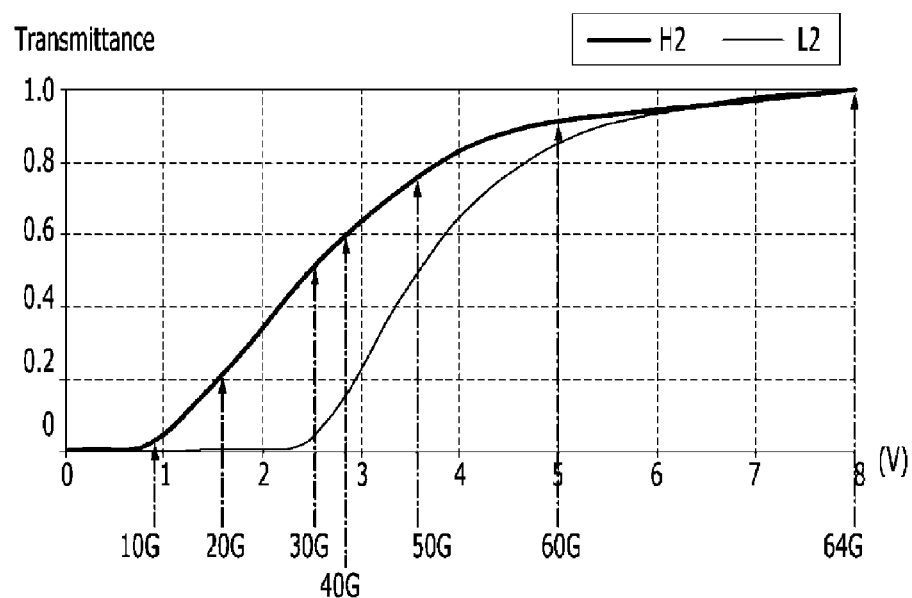

Hereinafter, a change in transmittance depending on a pixel voltage of the liquid crystal display in a test example of the present invention will be described with reference to FIG. 8 and FIG. 9. FIG. 8 and FIG. 9 are graphs showing the change in transmittance depending on the pixel voltage of the liquid crystal display in the test examples of the present invention.

In the test example, in a liquid crystal display as a first comparative object, a pixel electrode was divided into a first subpixel electrode and a second subpixel electrode, and a voltage applied to the second subpixel electrode was divided so that the voltage of the second subpixel electrode was adjusted to be lower than an inputted data voltage. In this case, the change H1 in transmittance depending on the data voltage applied to the first subpixel electrode and the change L1 in transmittance depending on the data voltage applied to the second subpixel electrode are shown in FIG. 8. Similarly, in a liquid crystal display as a second comparative object, a pixel electrode was divided into a first subpixel electrode and a second subpixel electrode, and the first subpixel electrode was formed such that a voltage thereof was adjusted to be lower than an inputted data voltage. In this case, the change H2 in transmittance depending on the data voltage applied to the first subpixel electrode and the change L2 in transmittance depending on the data voltage applied to the second subpixel electrode are shown in FIG. 9.

Referring to FIG. 8, the voltage of the second subpixel electrode among the first subpixel electrode and the second subpixel electrode to which the same data voltage is applied through the data line is decreased by a specific value. Accordingly, when the inputted data voltage is relatively low, e.g., about 4 V or less, the transmittance largely depends on the transmittance of the first subpixel electrode H1. As a result, it is difficult to facilitate gray expression since no change in transmittance is shown at a low gray region, e.g., until about a 20 gray (20 G). At a region in a range of about a 20 gray to a 40 gray, a rate of transmittance depending on the applied data voltage rises quickly, and thus the transmittance is quickly increased. This may cause a white screen phenomenon. As such, it is difficult to facilitate gray expression depending on the data voltage. At a high gray region corresponding to the data voltage of, e.g., about 6.7 V, the transmittance depending on the voltage of the second subpixel electrode is reduced, so that the entire transmittance of the liquid crystal display is lower with respect to the inputted data voltage. Accordingly, transmittance efficiency of the liquid crystal display is reduced as compared with the driving voltage.

Referring to FIG. 9, the voltage of the first subpixel electrode among the first subpixel electrode and the second subpixel electrode to which the same data voltage is applied through the data line is increased by a specific value. Accordingly, since the change in transmittance depending on the applied data voltage even at the low gray region is clear, it is possible to facilitate gray expression even at the low gray region.

Figure 10:
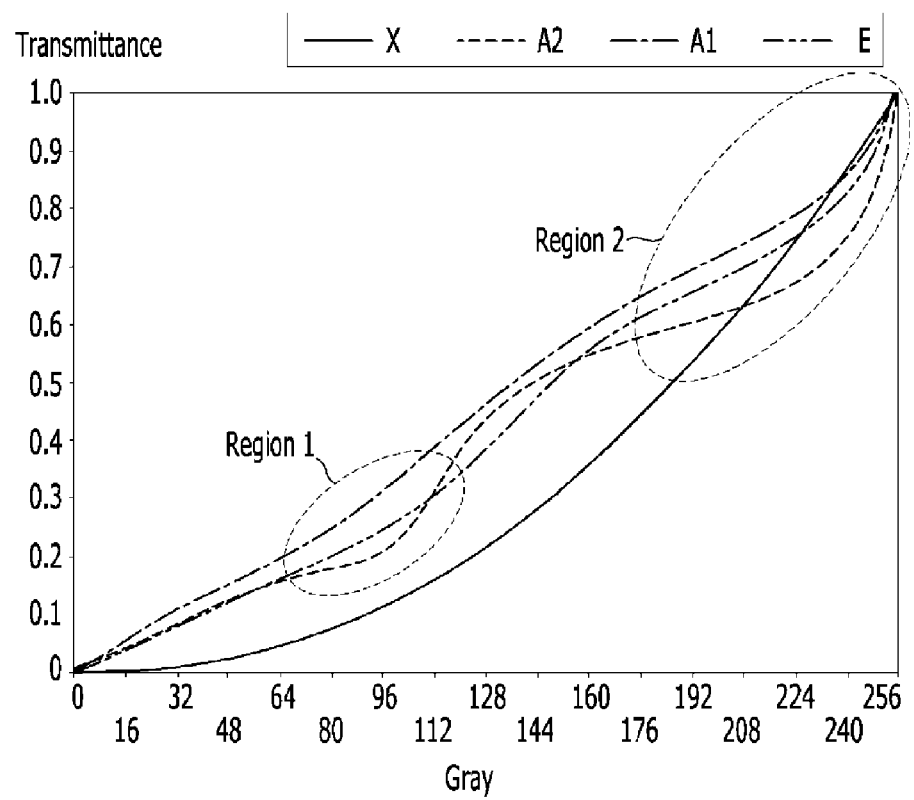
FIG. 10 is a graph showing a change in transmittance depending on a gray of the liquid crystal display in a test example of the present invention.

Hereinafter, a change in transmittance depending on a gray of the liquid crystal display in a test example of the present invention will be described with reference to FIG. 10. FIG. 10 is a graph showing the change in transmittance depending on the gray of the liquid crystal display in the test example of the present invention.

In this test example, X is the change in transmittance per gray at a front surface. A1 is the change in transmittance per gray at a side surface in the case that a pixel electrode was divided into a first subpixel electrode and a second subpixel electrode, and a voltage applied to the second subpixel electrode was divided so that the voltage of the second subpixel electrode was adjusted to be lower than an inputted data voltage in a liquid crystal display as a first comparative object. A2 is the change in transmittance per gray at a side surface in the case that a pixel electrode was divided into a first subpixel electrode and a second subpixel electrode, and the first subpixel electrode was formed such that a voltage thereof was adjusted to be lower than an inputted data voltage in a liquid crystal display as a second comparative object. E is the change in transmittance per gray in the case that one pixel is divided into three subpixels, a first subpixel electrode was formed such that a voltage thereof was adjusted to be higher than an inputted data voltage, a second subpixel electrode was formed such that a voltage thereof was adjusted to be lower than the inputted data voltage, and a third subpixel electrode was formed such that a voltage thereof was adjusted to be the same as the inputted data voltage in the liquid crystal display in accordance with the exemplary embodiment of the present invention. The data represents values that were measured and are now shown in FIG. 10.

Referring to FIG. 10, in the case of the liquid crystal display in accordance with the exemplary embodiment of the present invention, a phenomenon in which an image may be cloudy due to deterioration of the contrast ratio and the color contrast ratio, which is may be present in the first comparative object A1 at a region 1, is improved. A color distortion phenomenon is improved since a bump phenomenon indicated by a section in which the graph of FIG. 10 quickly decreases, as is the case in the second comparative object A2, is reduced.

Further, in the case of the liquid crystal display in accordance with the exemplary embodiment of the present invention, poor high-gray image distortion caused by a side gamma curve which is constant and then suddenly increases, as is the case in the second comparative object A2 at a region 2, is improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a first gate line and a second gate line to receive gate signals;
   a first data line and a second data line to receive data signals;
   a first reference voltage line and a second reference voltage line to receive a first reference voltage and a second reference voltage, respectively, the first and second reference voltages having different polarities;
   a first subpixel electrode, a second subpixel electrode, and a third subpixel electrode disposed in one pixel area;
   a first switching element electrically connected to the first gate line, the first data line, and the first subpixel electrode;
   a second switching element electrically connected to the first gate line, the first data line, and the second subpixel electrode;
   a third switching element electrically connected to one of the first gate line and the second gate line, one of the first data line and the second data line, and the third subpixel electrode;
   a fourth switching element electrically connected to the first gate line, the first reference voltage line, and the first subpixel electrode; and
   a fifth switching element electrically connected to the first gate line, the second reference voltage line, and the second subpixel electrode.

2. The liquid crystal display of claim 1, wherein a first data voltage applied to the first data line and the first reference voltage applied to the first reference voltage line have the same polarities.

3. The liquid crystal display of claim 1, wherein the first data voltage applied to the first data line and the second reference voltage applied to the second reference voltage line have opposite polarities, or the second reference voltage applied to the second reference voltage line is identical to a common voltage.

4. The liquid crystal display of claim 1, wherein a first subpixel voltage applied to the first subpixel electrode, a second subpixel voltage applied to the second subpixel electrode, and a third subpixel voltage applied to the third subpixel electrode are different from each other.

5. The liquid crystal display of claim 4, wherein the first reference voltage of the first reference voltage line and the second reference voltage of the second reference voltage line have constant magnitudes and are frame-inverted.

6. The liquid crystal display of claim 4, wherein the first subpixel voltage is larger than the second subpixel voltage, and the second subpixel voltage is larger than the third subpixel voltage.

7. The liquid crystal display of claim 1, wherein at least one of the first reference voltage line and the second reference voltage line extends in a same direction as the first gate line or the second gate line.

8. The liquid crystal display of claim 7, wherein at least one of the first reference voltage line and the second reference voltage line is disposed on the same layer as the first gate line or the second gate line.

* * * * *